(12) United States Patent
Nitzsche et al.

(10) Patent No.: US 9,486,885 B2
(45) Date of Patent: Nov. 8, 2016

(54) DRILLING TOOL FOR MACHINE TOOLS AND METHOD FOR THE PRODUCTION THEREOF

(71) Applicant: KOMET GROUP GMBH, Besigheim (DE)

(72) Inventors: Hendrik Nitzsche, Benningen (DE); Gerhard Stolz, Ingersheim (DE); Hans Haidinger, Pleidelsheim (DE); Benno Spors, Marbach (DE)

(73) Assignee: KOMET GROUP GMBH, Besigheim (DE)

( * ) Notice: Subject to any disclaimer, the term of this patent is extended or adjusted under 35 U.S.C. 154(b) by 71 days.

(21) Appl. No.: 14/589,055

(22) Filed: Jan. 5, 2015

(65) Prior Publication Data

US 2015/0107415 A1    Apr. 23, 2015

Related U.S. Application Data

(62) Division of application No. 12/733,300, filed as application No. PCT/EP2008/059921 on Jul. 29, 2008.

(30) Foreign Application Priority Data

Sep. 6, 2007    (DE) .................. 10 2007 042 280

(51) Int. Cl.
  *B23B 51/06*    (2006.01)
  *B23P 15/32*    (2006.01)
  (Continued)

(52) U.S. Cl.
  CPC ............ *B23P 15/32* (2013.01); *B23B 51/0493* (2013.01); *B23B 51/06* (2013.01); *B23P 15/28* (2013.01); *B23B 2251/043* (2013.01); *Y10T 408/455* (2015.01); *Y10T 408/9097* (2015.01)

(58) Field of Classification Search
  CPC ............ B23B 51/06; B23B 51/0486; B23B 51/0493; B23B 2251/043; B23B 2251/046; B23P 15/32
  USPC ............... 408/59, 223, 224, 227, 229, 230; 76/108.1, 108.6, 115; 175/323, 394, 175/395
  See application file for complete search history.

(56) References Cited

U.S. PATENT DOCUMENTS 162,315 A    4/1875   Shaw
4,188,813 A   2/1980  Bournicon et al.
(Continued)

FOREIGN PATENT DOCUMENTS

CH    665979 A5    6/1988
DE    33 09 860 A1    8/1984
(Continued)

OTHER PUBLICATIONS

German Patent Office Search Report dated Jul. 28, 2008 (4 pages).
(Continued)

*Primary Examiner* — Eric A Gates
(74) *Attorney, Agent, or Firm* — Flynn, Thiel, Boutell & Tanis, P.C.

(57) ABSTRACT

The invention relates to a drilling tool for machine tools has a drill body, a cutting head arranged on the front face of the drill body and a shaft arranged at the end thereof, wherein the drill body has two chip flutes, which are delimited at their flanks by ribs and a first chip flute of which is spirally curved. A second chip flute is not spiraled or is spirally curved with a pitch differing from the first chip flute, preferably running in the same direction of rotation.

13 Claims, 6 Drawing Sheets

(51) Int. Cl.
  *B23B 51/04* (2006.01)
  *B23P 15/28* (2006.01)

(56) References Cited

U.S. PATENT DOCUMENTS

| | | | |
|---|---|---|---|
| 4,704,055 | A | 11/1987 | Guehring |
| 5,478,176 | A | 12/1995 | Stedt et al. |
| 5,509,761 | A | 4/1996 | Grossman et al. |
| 5,634,747 | A * | 6/1997 | Tukala ............... B23B 51/0493 408/224 |
| 5,676,499 | A | 10/1997 | Tukala |
| 5,704,740 | A | 1/1998 | Ebenhoch et al. |
| 5,782,587 | A | 7/1998 | Basteck |
| 5,788,431 | A | 8/1998 | Basteck |
| 5,800,101 | A | 9/1998 | Jindai et al. |
| 6,030,155 | A | 2/2000 | Scheer et al. |
| 6,045,301 | A | 4/2000 | Kammermeier et al. |
| 6,248,277 | B1 * | 6/2001 | Friedrichs ............ B21C 23/147 264/167 |
| 6,349,779 | B1 | 2/2002 | Gilbert |
| 6,675,917 | B2 | 1/2004 | Kleine et al. |
| 6,948,891 | B2 | 9/2005 | Roman |
| 7,207,752 | B2 | 4/2007 | Schulte |
| 7,244,081 | B2 | 7/2007 | Johnson et al. |
| 7,340,978 | B2 * | 3/2008 | Kugelberg ............... B22F 3/22 29/557 |
| 7,997,836 | B2 | 8/2011 | Kim et al. |
| 8,382,403 | B2 | 2/2013 | Okumura |
| 8,678,072 | B2 * | 3/2014 | Shavit ................... B21C 23/147 164/113 |
| 8,753,046 | B2 * | 6/2014 | Schneider ................ B21F 7/00 408/230 |
| 2003/0185640 | A1 | 10/2003 | Ito |
| 2004/0101379 | A1 | 5/2004 | Mabuchi et al. |
| 2004/0175245 | A1 | 9/2004 | Takiguchi |
| 2005/0135887 | A1 | 6/2005 | Borschert et al. |
| 2005/0244235 | A1 | 11/2005 | Kleiner |
| 2006/0285935 | A1 | 12/2006 | Lin |
| 2007/0020054 | A1 | 1/2007 | Bruhn et al. |
| 2010/0178119 | A1 | 7/2010 | Volokh et al. |

FOREIGN PATENT DOCUMENTS

| | | |
|---|---|---|
| DE | 35 45 586 A1 | 7/1987 |
| DE | 195 22 837 A1 | 1/1997 |
| DE | 697 09 966 T2 | 10/2002 |
| EP | 0 883 455 B1 | 12/1998 |
| EP | 1260296 A1 | 11/2002 |
| JP | 57 107718 | 7/1982 |
| JP | 2001 121332 | 5/2001 |
| JP | 2006 326752 A | 12/2006 |
| WO | WO 2006/005451 A1 | 1/2006 |

OTHER PUBLICATIONS

International Search Report dated Nov. 24, 2008 (4 pages).

* cited by examiner

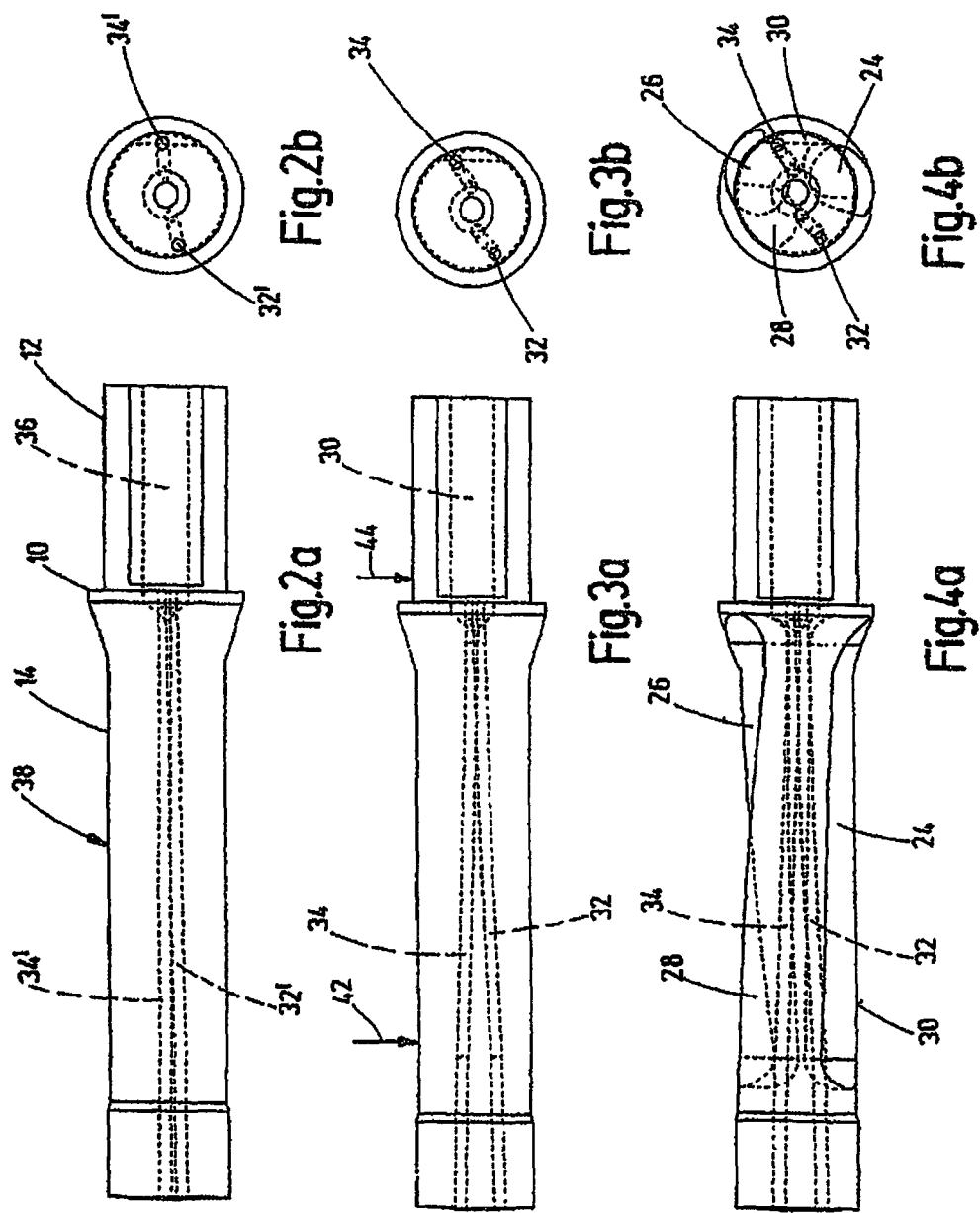

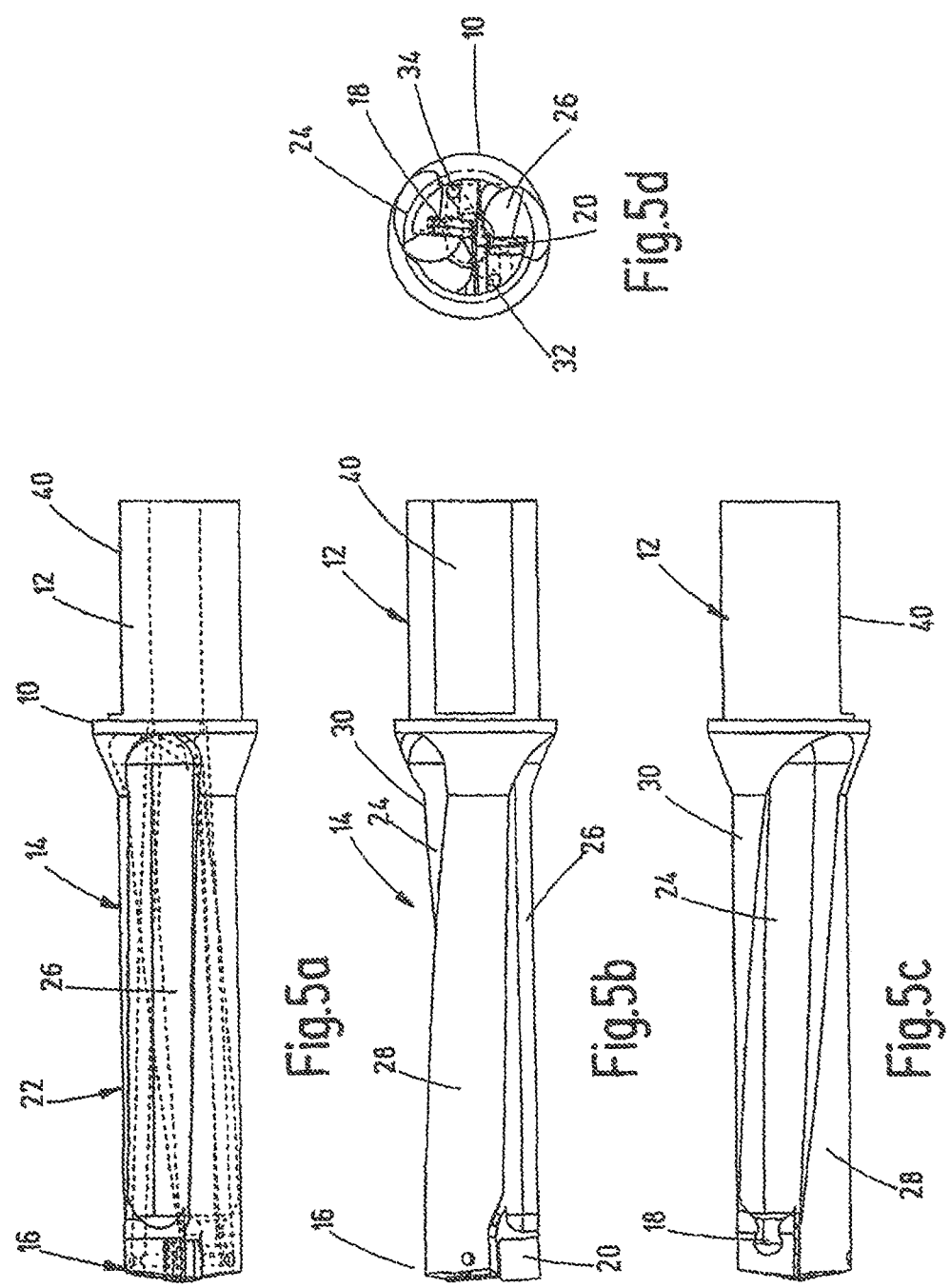

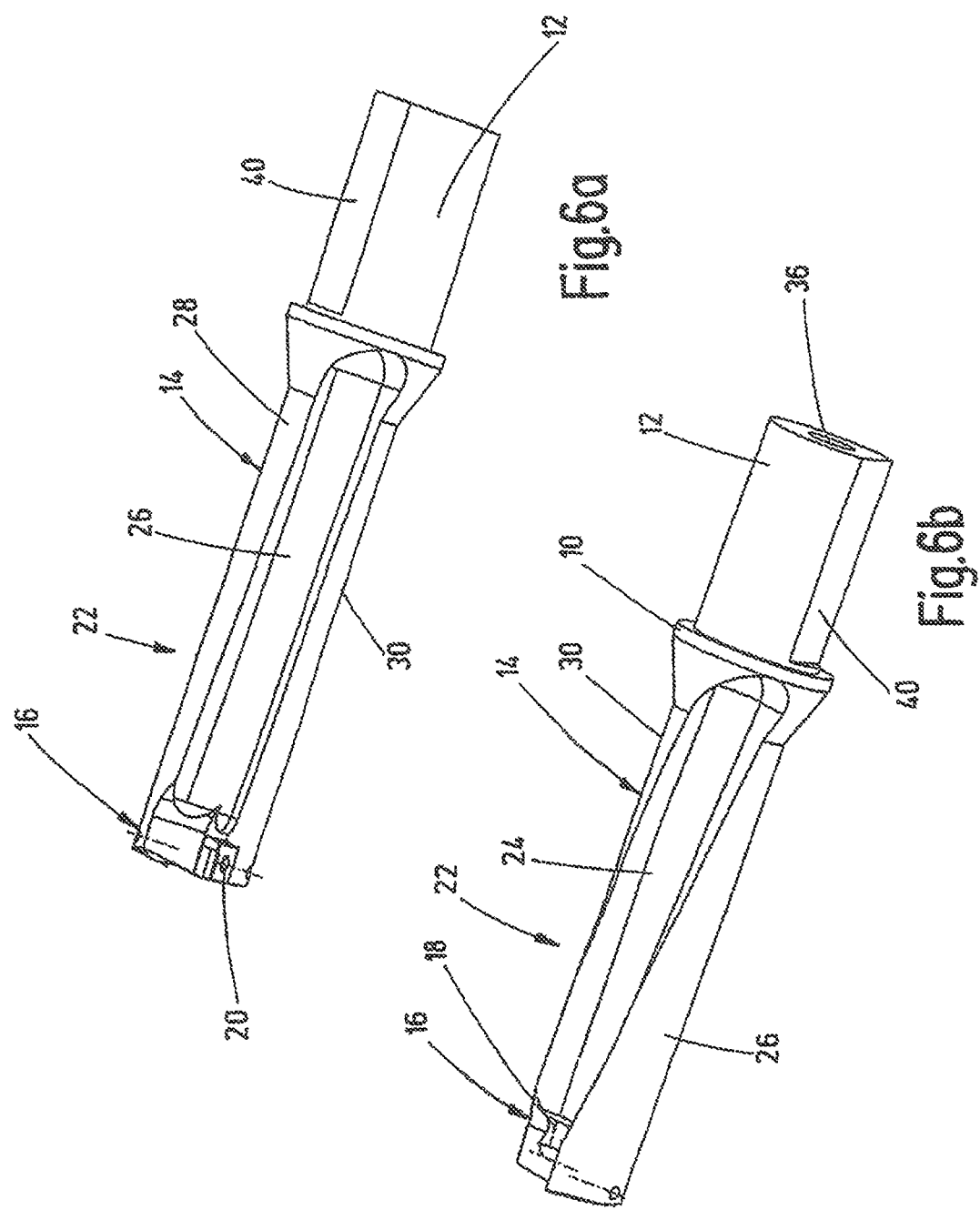

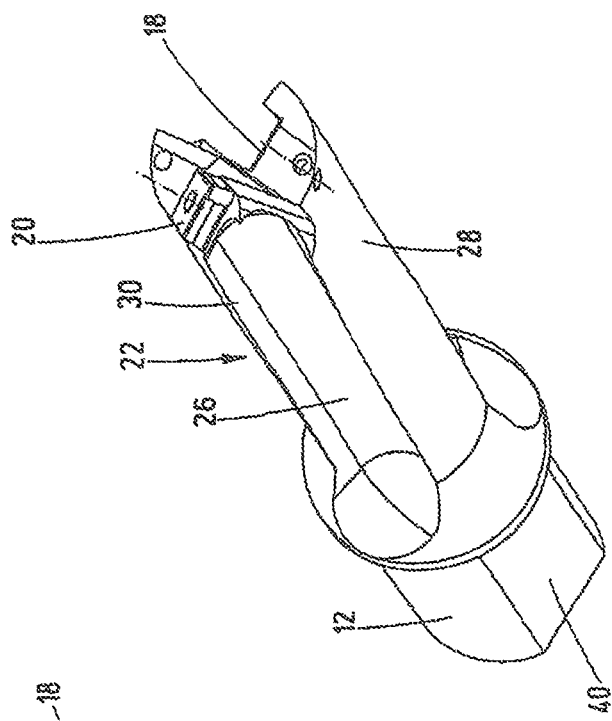
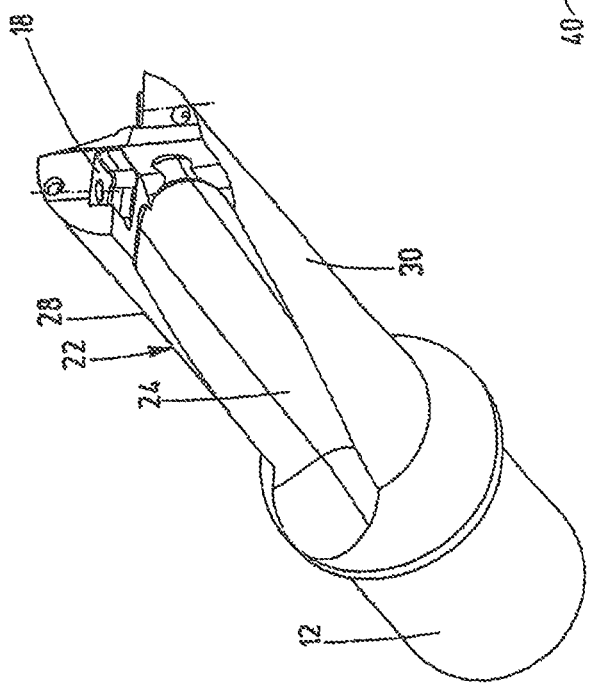

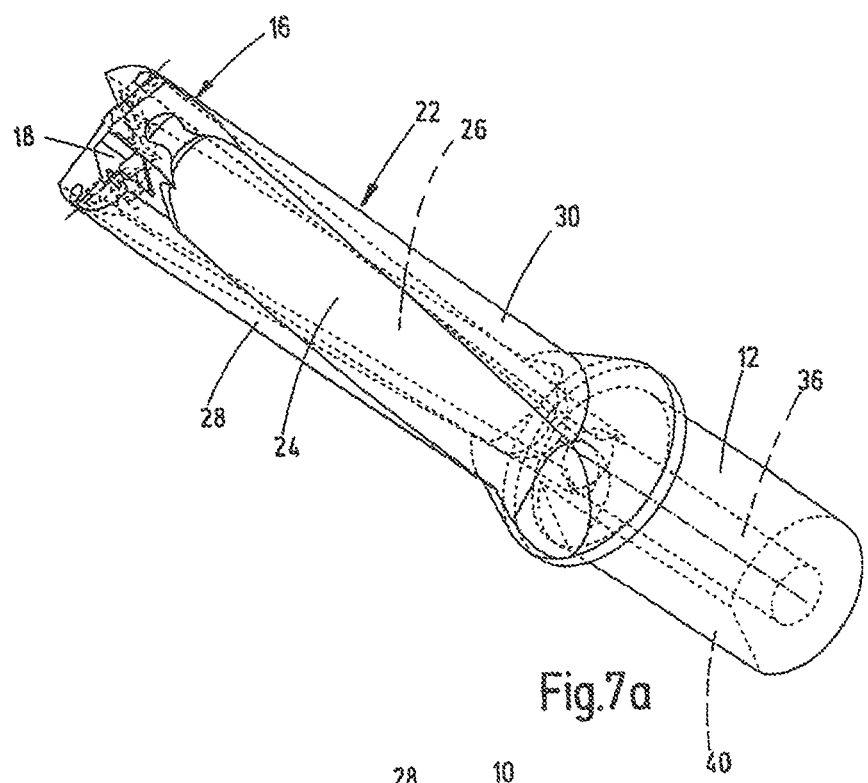
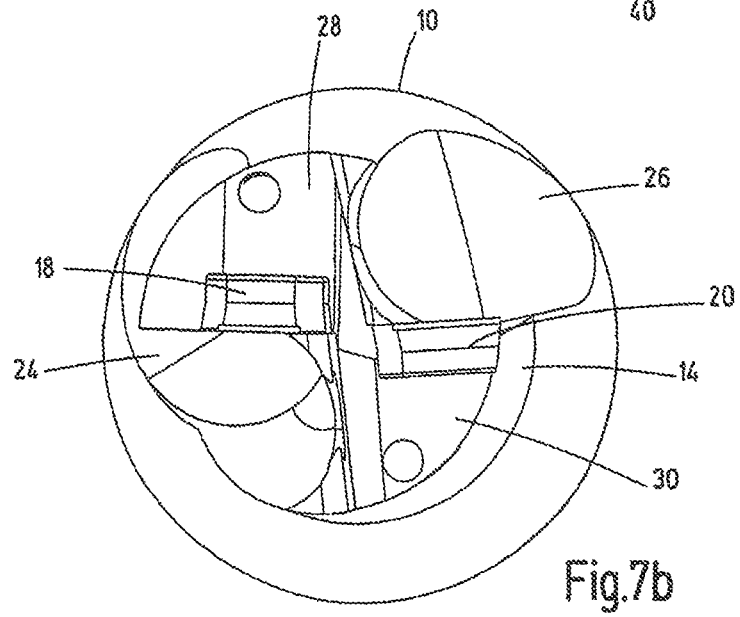

DRILLING TOOL FOR MACHINE TOOLS AND METHOD FOR THE PRODUCTION THEREOF

This is a divisional of prior U.S. application Ser. No. 12/733 300, which was the national stage of International Application No. PCT/EP2008/059921, filed Jul. 29, 2008.

DESCRIPTION

The invention relates to a drilling tool for machine tools and to a method for the production of a drilling tool such as this.

A drilling tool is known (EP-B-08834.55) which has a drill body, a cutting head which is arranged thereon at one end and a shank which is arranged thereon at the other end. The drill body has two chip flutes which are bounded on their flanks by ribs curved in a helical shape. Furthermore, the cutting head has two cutting inserts which are arranged at different radial distances from the drill axis, with mutually partially overlapping working areas in, in each case, one recessed inset, seat. In addition, at its end remote from the cutting head, the drill body has a drill shank which has no ribs and contains a central coolant supply channel, and coolant channels are arranged in the ribs of the drill body, The coolant channels pass in a helical shape through the drill body and open into the central supply channel. The ribs Which are located between the chip flutes are helical with the same pitch as known drills. Their width is the same over the drill length. It has admittedly already been proposed that the chip flutes have variable pitches along the drill body. However, the mutual separation between the chip flutes and the width of the ribs located between them remain essentially the same.

It has been found that the quality of a drilling tool is substantially dependent on its physical features. Fundamentally, it is possible to influence the removal behavior, the oscillation behavior, the bending behavior, the chip formation and the chip removal behavior of a drill in a positive manner by suitable design measures.

Against this background, the present invention is based on the object of improving the behavior of a drilling tool during the drilling process in terms of oscillation, bending and twisting in the area of the drill body. A further object is to provide a method which is particularly highly suitable for the production of the tools according to the invention.

The combinations of features specified in the present invention have been proposed in order to solve this problem. Advantageous refinements and developments of the invention are also specified.

The invention essentially consists in that chip flutes associated with the various cutters have different pitches in their profile over the drill body. This results in different cross-sections or widths, which are at the same time variable over the length, of the ribs which are located between the chip flutes and have a significant influence on the bending and torsional response of the drill body. In the ideal case, the aim is for the neutral line of the drill bending to coincide with the central axis. In this case, the bending forces are canceled out, as a result of which only torsion forces now act on the drill body. On the other hand, the torsion can be compensated for or eliminated by appropriate stiffening in the torsional direction, that is to say, in the circumferential direction. For this purpose, it is advantageous for the cross-section of the ribs to be varied permanently over the length of the drill shank. The aim of this variation is to dampen torsional oscillations.

In order to achieve this, it is proposed that, on a drill body with two chip flutes which are bounded on their flanks by ribs, the first chip flute is curved in a helical shape, while a second chip flute is not helical or is curved in a helical shape with a pitch which differs from that of the first chip flute, and runs in the same rotation direction.

At least one cutter is in each case advantageously arranged at the cutting-head end of each chip flute and, for example, may in each case be formed by a cutting insert or by a drill bit which is arranged detachably on the drill body.

In the case of cutting inserts, it is advantageous for these to be arranged at different radial distances from a central axis of the drill body in the individual chip flutes, wherein the outer cutting edge of an outer cutting insert projects radially beyond. the circumference of the drill body, and the inner cutting edge of an inner cutting insert projects radially beyond the central axis, and wherein the chip flute which is associated with the inner cutting insert is more helical than the chip flute associated with the outer cutting insert. In these considerations, it should be remembered that the outer cutting insert and the associated outer groove have a greater influence on the oscillation behavior, since the cutting forces which occur there and the amount of material removed there are several times greater than on the inner cutting insert and in the area of the inner chip flute. One important aim of the invention is therefore to stiffen the ribs in the area of the outer groove. This can be achieved by the outer groove being less helical than the inner groove. In a corresponding manner, according to one preferred refinement of the invention, the rib to which the outer cutting insert is fitted has a profile which becomes broader from the cutting head to the drill shank, and the rib to which the inner cutting insert is fitted becomes narrower. In a generalized form, this means that a first of the ribs which are arranged between the chip flutes has a profile which becomes broader from the cutting head toward the shank, and in that a second of the ribs which are arranged between the chip flutes has a profile which becomes narrower from the cutting head toward the shank.

A further preferred refinement of the invention provides that coolant channels are arranged in the ribs of the drill body, extend from the shank end to the cutting-head end of the drill body, and have an outlet opening at the cutting-head end, wherein the coolant channels which are arranged in the various ribs are differently helical or are not helical. In this case, the outlet openings of the coolant channels are advantageously arranged within in each case one of the chip flutes, wherein the outlet openings preferably communicate via a non-helical channel end piece with one of the coolant channels which are arranged in the ribs. In this case, the outlet openings expediently have an oval or egg-shaped outline which is elongated in the direction of the chip flutes. In order to avoid blockages and to improve the way in which the chips are carried away, the outlet openings may form a groove which runs along the chip flutes, or open into such a groove.

Various method variants are proposed according to the invention for the production of the drilling tools according to the invention.

According to a first method variant, the following method steps are proposed:

a base material body is turned by machining to a drilling body contour forming a rotationally symmetrical first blank, at least two chip flutes are milled into a cylindrical section of the blank, wherein one of the chip flutes is first of all milled into the blank in the form of a straight or helical groove, while the second chip flute is milled in with a different helical shape from the helical shape of the first chip flute, the blank which has been prefabricated in this way is heated to a predetermined temperature at clamping-in points, which are arranged at an axial distance from one another, in a zone which is located between the clamping-in points, and has a coaxial torsional moment applied to it at the clamping-in points and in the process is plastically twisted in a helical shape through a predetermined angle.

These measures result in the two chip flutes being curved with a different pitch and the same rotation direction, such that a first rib, which is arranged between the chip flutes, becomes broader in its profile from the cutting head to the shank, and the other becomes narrower. In principle, it is possible for the prefabricated blank to be twisted in a helical shape in a rotation direction in the opposite sense to the helical shape of the second groove. This means that one of the two chip flutes in the finished drill body runs in a straight line, or even runs in a helical shape in the opposite direction to the rotation direction.

According to a second method variant of the invention, the following method steps are proposed:

a base material body is turned by machining a drilling body contour forming a rotationally symmetrical first blank, at least two chip flutes are milled into a cylindrical section of the blank, wherein the blank which has been prefabricated in this way is heated to a predetermined temperature at clamping-in points, which are arranged at an axial distance from one another, in a zone which is located between the clamping-in points, and has a coaxial torsional moment applied to it at the clamping-in points and in the process is plastically twisted in a helical shape through a predetermined angle, with the special feature that the blank is first of all provided with a first straight longitudinal groove, is then heated and is initially twisted through a first rotation angle, and that a second groove is then milled into the initially twisted blank, and that the blank is then twisted through a second rotation angle, in the heated state.

In this way, it is also possible to produce a drill body with chip flutes with different helical shapes.

In all the above cases, one preferred refinement of the invention proposes that a deep-hole bore is incorporated into the ribs, which remain between the grooves during the milling process, before the twisting of the blank, and is made helical during the twisting of the blank, forming the coolant channel. In the second method variant, it is in this case advantageous for the first deep-hole bore to be incorporated after the introduction of the first straight groove, and for the second deep-hole bore to be incorporated after the introduction of the second straight groove.

According to the invention, a third method variant provides the following method steps a base material body is turned by machining to a drilling body contour forming a rotationally symmetrical blank, two deep-hole bores are incorporated in the first blank, which has been produced in this way, are arranged at a distance from one another and extend from points which are arranged eccentrically with respect to a center axis on the end face of the cutting-head-end blank end, in the direction of its shank, the second blank which has been prefabricated in this manner is heated to a predetermined temperature at clamping-in points, which are arranged at an axial distance from one another, in a zone which is located between them, and is twisted plastically in a helical shape through a predetermined angle, wherein, it is proposed as a special feature that one of the deep-hole bores runs obliquely with respect to the other deep-hole bore and with respect to the central axis of the first blank, and that two chip flutes are milled straight and/or in a helical shape in the twisted third blank such that the twisted deep-hole bores run within ribs which remain between adjacent flanks of the chip flutes.

These measures mean that the chip flutes which are incorporated after the twisting can have different helical pitches, thus ensuring that the deep-hole bores likewise have different helixes and are located in the ribs between the chip flutes.

Furthermore, these measures make it particularly simple to mill the deep-hole bores on the cutting head side in an untwisted, preferably straight, area, forming outlet openings which open into the chip flutes. In addition, seating depressions for holding cutting inserts can be incorporated into the cutting-head end of the ribs, in the immediate vicinity of the outlet openings. The deep-hole bores on the cutting head side are expediently shaped in their untwisted straight area with an oval or egg-shaped outline, forming outlet openings, in which case the deep-hole bores on the cutting head side can be shaped to create grooves which are open at the edge.

BRIEF DESCRIPTION OF THE DRAWINGS

The invention will be explained in more detail in the following text with reference to the drawings, in which:

FIGS. 2a and b show a side view and a plan view of the blank provided with deep-hole bores, as shown in FIG. 1b;

FIGS. 3a and b show a side view and a plan view of the blank as shown in FIGS. 2a and b, in the twisted state;

FIGS. 4a and b show a side view and a plan view of the blank as shown in FIGS. 3a and b, with two milled-in chip flutes;

FIGS. 5a to d show three side views and one plan view of the drilling tool produced from the blank as shown in FIGS. 4a and b;

FIGS. 6a to d show a side view and three diagrammatic illustrations of the drilling tool shown in FIGS. 5a to d;

FIGS. 7a and b show a diagrammatic illustration and a plan view of a drilling tool with a straight outer chip flute and a helical inner chip flute.

DETAILED DESCRIPTION OF THE INVENTION

Figure 1A:
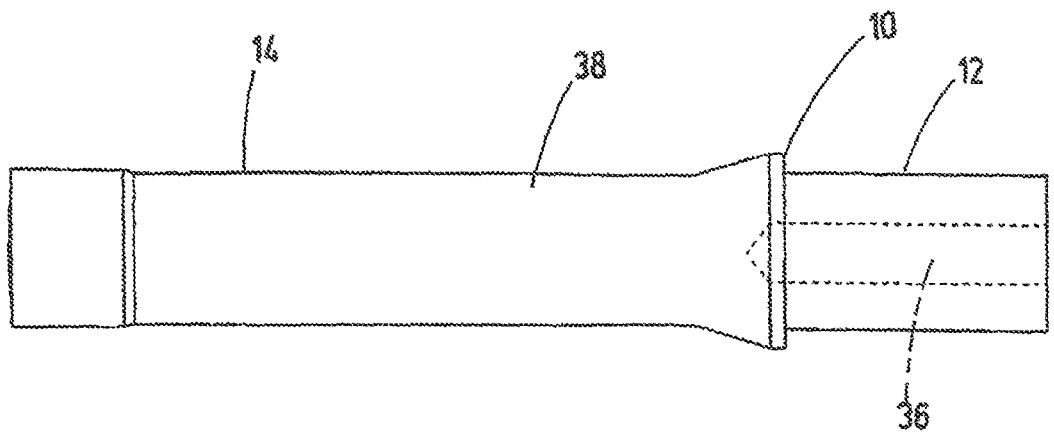
FIGS. 1a and b each show a side view of a rotationally symmetrical blank, which has been turned to a drill body contour, with and without a clamping surface.

The drilling tools illustrated in FIGS. 5a to 7b are intended for use in machine tools. Each drilling tool essentially comprises a drill shank 12, which can be clamped in a tool holder which is not illustrated and has a collar 10 in the form of a stop for the tool holder, a drill body 14 and a cutting head 16 which is arranged at the end on the drill body 14. The cutting head 16 has a radially inner recess 18 and a radially outer recess 20 which each hold a replaceable cutting insert, which is not illustrated. The drill body 14 has a chip removal element 22 between the cutting head 16 and the collar 10 which has an inner chip flute 24 associated with the inner recess 18, and an outer chip flute 26 associated with the outer recess 20, which are separated from one another on their flanks by ribs 28, 30. The rib which is provided with the inner recess 18 at its cutting-head end is referred to in the following text as the inner rib 28, and the rib which is provided with the outer recess 20 is referred to as the outer rib 30. As can be seen in particular from FIGS. 5a and 7a, two coolant channels 32, 34 are arranged in the drill body 14, run within the ribs 28, 30 from the cutting-head end to the shank end of the drill body 14, and open into a central supply channel 36 at the shank end.

In the exemplary embodiment shown in FIGS. 5a to 6d, both chip flutes 24, 26 are curved in a helical shape. In a corresponding manner, the associated ribs 28, 30 also have helical curvature. One special feature of this exemplary embodiment is, however, that the outer chip flute 26 which is associated with the outer recess 20 has a smaller curvature, and is therefore steeper, than the chip flute 24 associated with the inner recess 18. In a corresponding manner, the associated ribs 28, 30 have a variable width from their cutting-head end to the shank end, which becomes narrower in said direction in the case of the inner rib 28, and becomes broader in the case of the outer rib 30. These measures result in the drill being stiffer, thus improving the bending and torsional behavior of the drill body 14 during the drilling process, and therefore reducing the tendency to oscillate. This is particularly important for reamers, which make it possible to achieve a better drilling behavior, both with regard to the achievable drilling speed and with regard to the drilling result, because of the described measures.

The coolant channels 32, 34 must be placed within the drill body 14, before or after the introduction of the chip flutes 24, 26, such that they are completely embedded in the ribs 28, 30 between the chip flutes 24, 26.

Various method variants are proposed for the production of the described drilling tools.

Figure 1B:
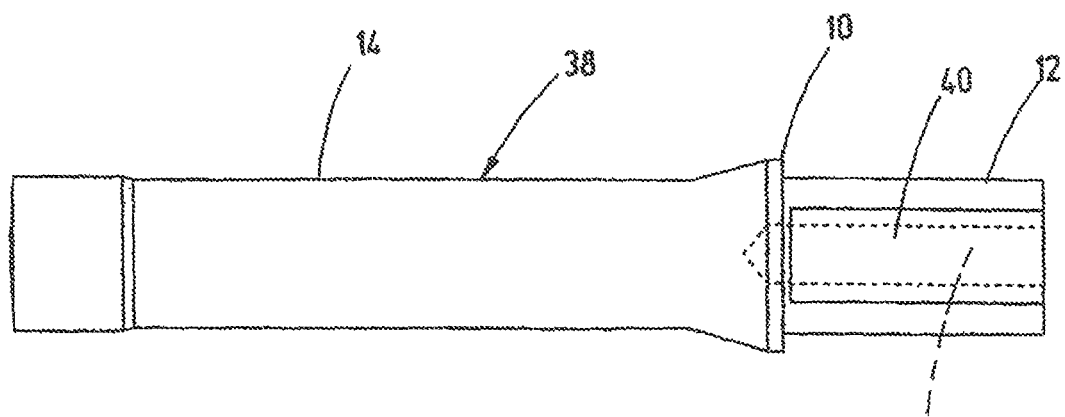

In a first method step, a base material body is always turned by machining to a drill body contour, forming a rotationally symmetrical first blank 38 (FIG. 1a. Furthermore, the central supply channel 36 and a clamping surface 40 on one side (FIG. 1b) are formed in the shank 12.

In the procedure indicated in FIGS. 2a to 4b, two deep-hole bores 32', 34' are first of all incorporated in the first blank 38, running eccentrically from the cutting-head end to the shank end obliquely through the drill body 14, and opening at their shank end into the central supply channel 36. As can be seen from FIG. 2b, the deep-hole bores 32', 34' are arranged at an angle other than 180° with respect to one another in the circumferential direction thus ensuring in the finished drill that the coolant channels are located within the ribs 28, 30, which are still to be produced.

In a second method step as shown in FIGS. 3a and b, the drill body is clamped in between the positions 42 and 44, heated in the intermediate area to a predetermined temperature and then subjected to a torsional moment between the two clamping-in points, ensuring that the drill body is plastically deformed and, in the process, that the deep-hole bores 32', 34' are twisted with respect to one another, forming helical coolant channels 32, (cf. FIG. 3b).

In a third method step as shown in FIGS. 4a and b, helical chip flutes 24, 26 are then incorporated in the blank, as shown in FIGS. 3a and b, such that the outer chip flute 26 has a smaller helix and is therefore steeper than the inner chip flute (cf. FIG. 4b). This results in the ribs 28, 30 having the thickness profile as described above, that is variable in its longitudinal direction.

In a final method step, the blank as shown in FIGS. 4a, b is shortened at its cutting-head end and is then provided with the recesses 18, 20 which form the insert seats. This results in the complete drilling tool as shown in FIGS. 5a to d and 6a to d, into whose recesses 18, 20 the replaceable cutting inserts, which are not illustrated, still have to be inserted.

The exemplary embodiment shown in FIGS. 7a and b differs from the exemplary embodiment shown in FIGS. 5 and 6 in that only the inner chip flute 24 has a helical shape, and the outer chip flute 26 runs non-helically in a straight line. In order to produce a drill body 14 such as this, the chip flutes 24, 26 are either incorporated in the blank helically in opposing senses before the twisting process, such that the outer chip flute 26 is aligned essentially in a straight line during the subsequent twisting process. With this method, it is also possible to produce chip flutes with different pitches in one twisting process. For this purpose, all that is necessary is to appropriately align the flutes, with the blank in the untwisted state.

A further possible way to produce helical chip flutes 24, 26 with a different pitch is to introduce them in two steps. First of all, a first non-helical or helical flute is incorporated in the blank before it is twisted. The blank is then subjected to a first twisting process. A second chip flute is then milled in, which may be non-helical or helical. If straight chip flutes are in each case provided initially, a second twisting process is expediently also carried out, thus producing two differently helical chip flutes 24, 26. One of the deep--hole bores 32', 34' can in each case be incorporated before the twisting steps, which bores are provided with different helical shapes during the further machining process, together with the chip flutes 24, 26 and the ribs 28, 30 arranged between them.

In summary, the following statement can be made: the invention relates to a drilling tool for machine tools. The drilling tool comprises a drill body 14, a cutting head 16 arranged thereon at one end, and a shank 12 arranged thereon at the other end, wherein the drill body 14 has two chip flutes 24, 26 which are bounded on their flanks by ribs 28, 30 and of which a first chip flute 24 is curved in a helical shape. One special feature of the invention is that a second chip flute 26 is not helical or is curved in a helical shape with a pitch which is not the same as the first chip flute 24 but preferably runs in the same rotation direction.

What is claimed is:

1. A method for producing drilling tools, comprising a drill body (14) having an end cutting head (16) and an end shank (12), comprising the steps of: turning a base material body by machining to a drilling body contour to form a rotationally symmetrical blank (38), milling at least two chip flutes (24, 26) into a cylindrical section of the blank (38), wherein a first of the chip flutes (26) is first of all milled into the blank (38) in the form of a non-helical groove, and heating the blank which has been prefabricated in this way to a predetermined temperature at clamping-in points (42, 44), which are arranged at an axial distance from one another, in a zone which is located between the clamping-in points, and has a coaxial torsional moment applied to it at the clamping-in points (42, 44) and in the process is plastically twisted in helical shape through a predetermined angle, characterized in that a second chip flute (24) in the form of a helical groove is milled into the prefabricated blank such that a rib (28, 36) remains between each of the chip flutes (24, 26), the profile of which ribs (28, 36) has a variable width along the drill body (14) and a deep-hole bore (32', 34') is incorporated into the ribs (28, 30), which remain between the grooves during the milling process, before the twisting of the blank and is made helical during the twisting of the blank, forming a coolant channel 32, 34).

2. The method as claimed in claim 1, characterized in that the first deep-hole bore (32') is incorporated after the introduction of the first straight groove, and in that the second deep-hole bore (34') is incorporated after the introduction of the second straight groove.

3. The method as claimed in claim 1, characterized in that the prefabricated blank is twisted in a helical shape in the same rotation direction as the helix of the second chip flute (24).

4. The method as claimed in claim 1, characterized in that the prefabricated blank is twisted in a helical, shape in the opposite rotation direction to the helix of the second chip flute (24).

5. A method for producing drilling tools, comprising a drill body (14) having an end cutting head (16) and an end shank (12), comprising the steps of: turning a base material body by machining to a drilling body contour forming a rotationally symmetrical first blank (38), milling at least two chip flutes (24, 26) into a cylindrical section of the blank (38), wherein a first of the chip flutes is milled into the blank at first in the form of a non-helical straight longitudinal groove, and heating the blank which has been prefabricated in this way to a predetermined temperature at clamping-in points (42, 44), which are arranged at an axial distance from one another, in a zone which is located between the clamping-in points, and has a coaxial torsional moment applied to it at the clamping-in points (42, 44) and in the process is plastically twisted in helical shape through a predetermined angle, characterized in that the blank is first of all provided with a first straight longitudinal groove (24), is then heated and is initially twisted through a first rotation angle, in that a second groove (26) is then milled into the initially twisted blank, and in that the blank is then twisted through a second rotation angle, in the heated state and a deep-hole bore (32', 34') is incorporated into the ribs (28, 30), which remain between the grooves during the milling process, before the twisting of the blank and is made helical during the twisting of the blank, forming a coolant channel 32, 34).

6. The method as claimed in claim 5, characterized in that the first deep-hole bore (32') is incorporated after the introduction of the first straight groove, and in that the second deep-hole bore (34') is incorporated after the introduction of the second straight groove.

7. A method for producing drilling tools, comprising a drill body (14) having an end cutting head (16) and an end shank (12), comprising the steps of: turning a base material body by machining to a drilling body contour forming a rotationally symmetrical blank (38), milling at least two chip flutes (24, 26) into a cylindrical section of the blank (38), wherein one of the chip flutes (24) is milled into the blank in the form of a straight or helical groove, and heating the blank which has been prefabricated in this way to a predetermined temperature at clamping-in points (42, 44), which are arranged at an axial distance from one another, in a zone which is located between the clamping-in points, and has a coaxial torsional moment applied to it at the clamping-in points (42, 44) and in the process is plastically twisted in helical shape through a predetermined angle, characterized in that the second chip flute (26) is milled in helically with a pitch which is not the same as the pitch of the first chip flute (24), before the blank is twisted to a helical shape and a deep-hole bore (32', 34') is incorporated into the ribs (28, 30), which remain between the grooves during the milling process, before the twisting of the blank and is made helical during the twisting of the blank, forming a coolant channel 32, 34).

8. The method as claimed in claim 7, characterized in that the two chip flutes (24, 26) are incorporated helically in opposite senses in the blank, and in that the blank that has been produced in this way is then twisted such that the chip flutes (24, 26) are helical in the same sense, or such that one of the chip flutes (26) is not helical.

9. A method for producing a drilling tool, comprising a drill body (14) having an end cutting head (16) and an end shank (12), comprising the steps of: turning a base material body by machining to a drilling body contour forming a rotationally symmetrical first blank (38), incorporating two deep-hole bores (32', 34') in the first blank such that they are arranged at a distance from one another and extend from points which are arranged eccentrically with respect to a center axis on the end face of the cutting-head-end blank end, in the direction of its shank (12) to form a second blank, and heating the second blank which has been prefabricated in this manner to a predetermined temperature at clamping-in points (42, 44), which are arranged at an axial distance from one another, in a zone which is located between them, and is twisted plastically in a helical shape through a predetermined angle to form a twisted third blank, characterized in that one of the deep-hole bores (32') runs obliquely with respect to the other deep-hole bore (34') and with respect to the central axis of the first blank, and in that two chip flutes (24, 26) are milled straight and/or in a helical shape in the twisted third blank such that the coolant channels (32, 34) which are formed during twisting run within ribs (28, 30) which remain between adjacent flanks of the chip flutes (24, 26), the profile of which ribs (28, 36) has a variable width along the drill body (14) and a deep-hole bore (32', 34') is incorporated into the ribs (28, 30).

10. The method as claimed in claim 9, characterized in that the coolant channels (32, 34) on the cutting-head side are milled in an untwisted, preferably straight, area, forming outlet openings which open into the chip flutes (24, 26).

11. The method as claimed in claim 10, characterized in that recesses (18, 20) for holding cutting inserts are incorporated in the cutting-head end of the ribs (28, 30), in the immediate vicinity of the outlet openings.

12. The method as claimed in claim 10, characterized in that the coolant channels (32, 34) on the cutting-head side are milled in their untwisted straight area, forming outlet openings with an oval or egg-shaped outline.

13. The method as claimed in claim 12, characterized in that the coolant channels (32, 34) on the cutting-head side are milled in their untwisted straight area, forming outlet openings which are in the form of grooves, which are open at the edge, in the profile of the chip flutes (24, 26).

* * * * *